April 15, 1952     T. F. HALL ET AL     2,593,024
VEHICLE ATTACHED PARKING DEVICE
Filed Aug. 25, 1947     4 Sheets-Sheet 1
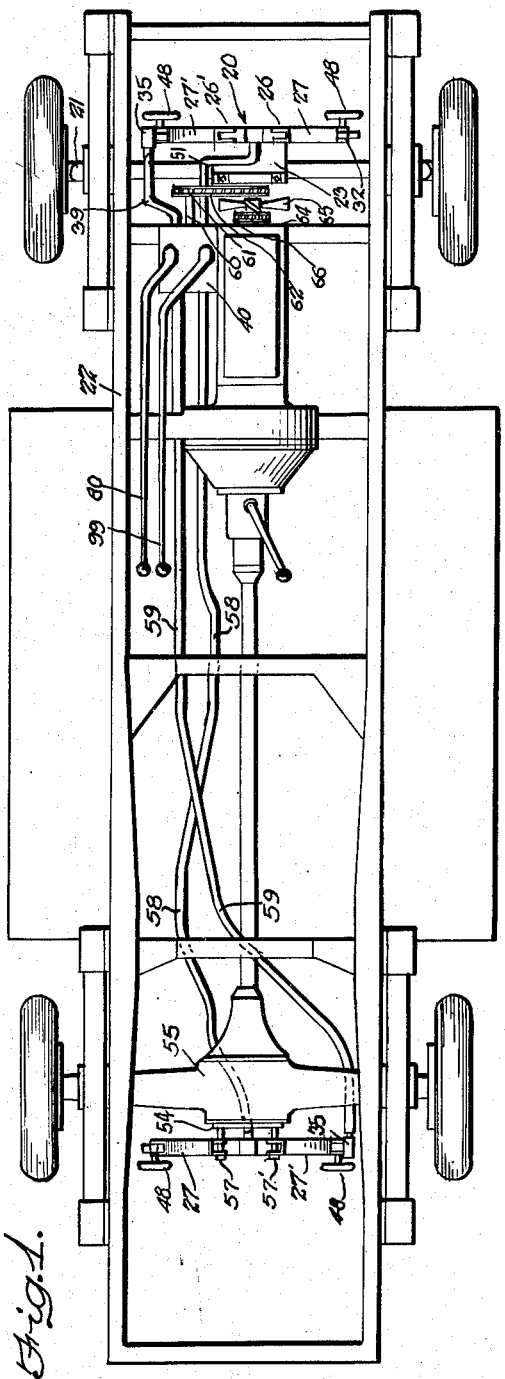
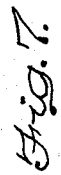
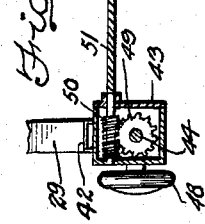
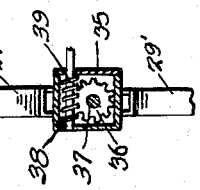
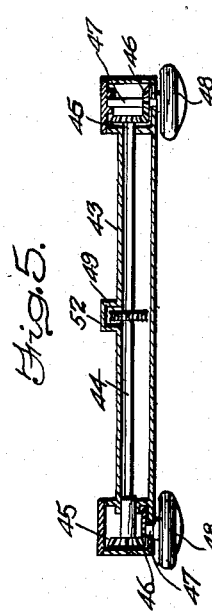
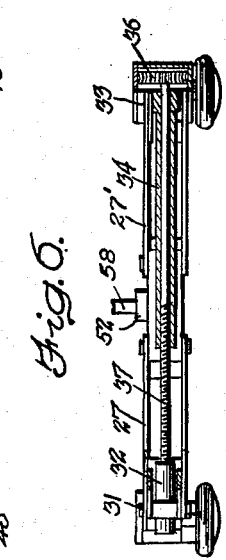
INVENTORS
Tilden F. Hall &
Floyd C. Hall
BY Victor J. Evans & Co.
ATTORNEYS April 15, 1952     T. F. HALL ET AL     2,593,024
VEHICLE ATTACHED PARKING DEVICE
Filed Aug. 25, 1947     4 Sheets-Sheet 2
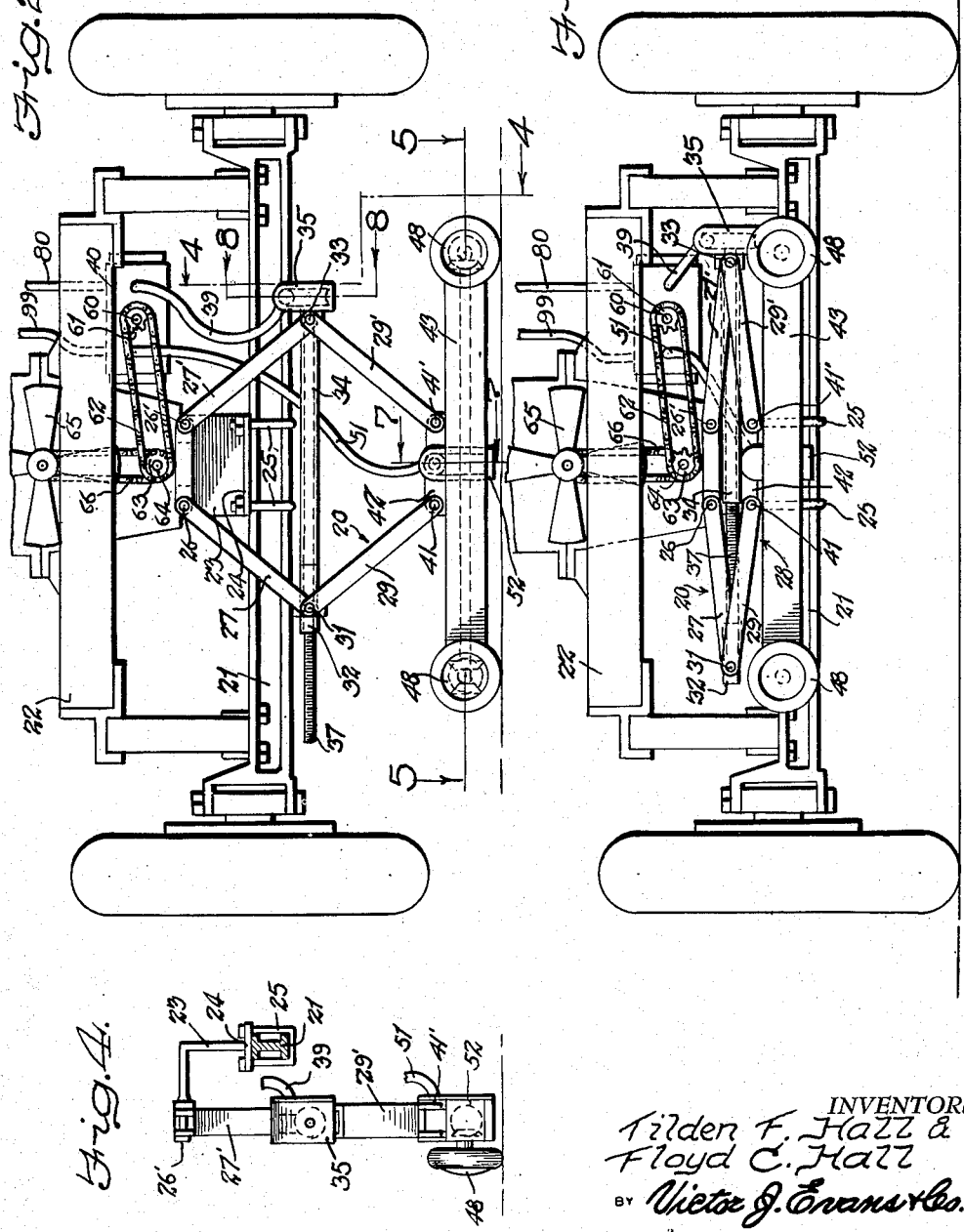
INVENTORS
Tilden F. Hall &
Floyd C. Hall
BY *Victor J. Evans & Co.*
ATTORNEYS

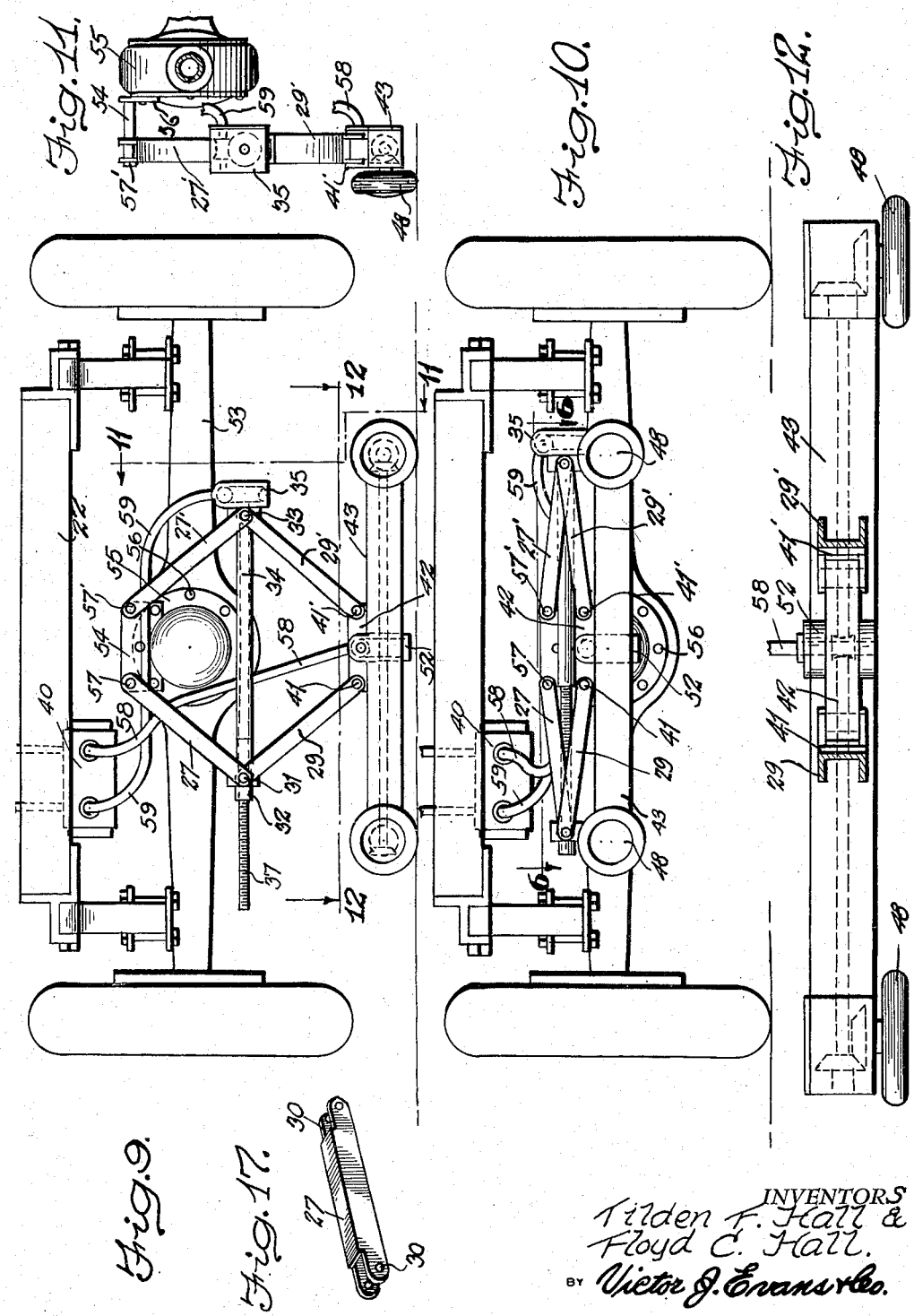

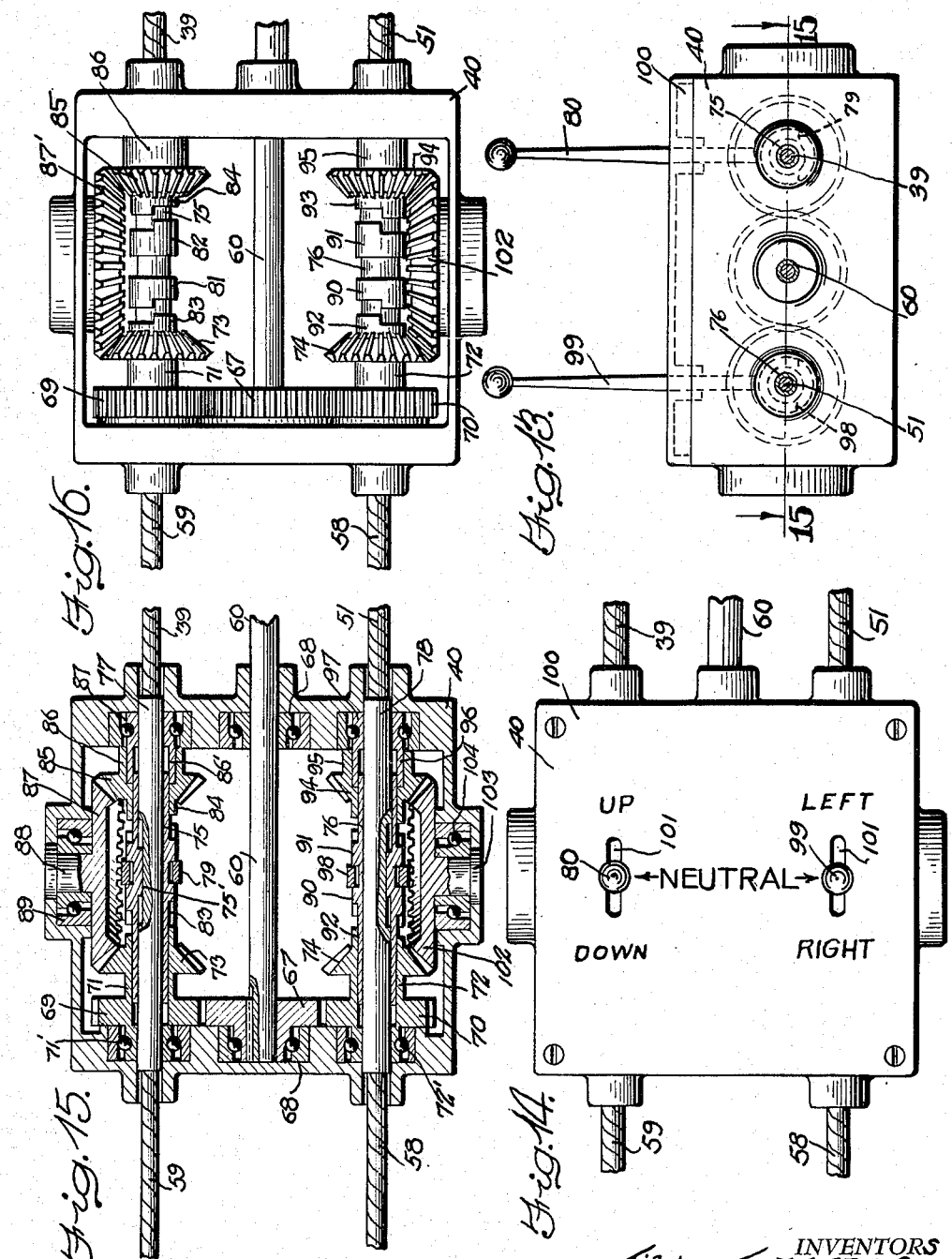

Patented Apr. 15, 1952

2,593,024

UNITED STATES PATENT OFFICE 2,593,024

VEHICLE ATTACHED PARKING DEVICE

Tilden F. Hall and Floyd C. Hall, Denver, Colo.

Application August 25, 1947, Serial No. 770,466

1 Claim. (Cl. 180—1)

This invention relates to improvements in vehicle parking devices and more particularly to a vehicle elevating and parking mechanism which is adapted to be permanently secured to the chassis of the vehicle.

The mechanism embodying the invention will, when in operative position, permit a vehicle to be parked between other vehicles or other types of obstructions, when the space in which the vehicle is to be parked is only slightly longer than the overall length of the vehicle.

An object of the invention is to provide a mechanism of the type described, which, when in operation, will raise the front and rear wheels of a vehicle so that the vehicle can be moved sideways into a parking space.

Another object of the invention is to provide a mechanism of the type which can be operated from the driver's seat.

A further object of the invention is to provide a mechanism of this type that, when in retracted or inoperative position, will be raised sufficiently to permit full road clearance of the chassis of the vehicle.

With the above and other objects and advantages in view, the invention consists of the novel details of construction, arrangement and combination of parts more fully hereinafter described, claimed and illustrated in the accompanying drawings in which:

Figure 1 is a top plan view of a vehicle chassis, showing an embodiment of the invention attached thereto;

Figure 2 is a front view of a vehicle chassis showing an embodiment of the invention in elevation in raised or operative position;

Figure 3 is a front view of a vehicle chassis showing an embodiment of the invention in elevation in retracted or inoperative position;

Figure 4 is a sectional view on the line 4—4 of Figure 2;

Figure 5 is a sectional view on the line 5—5 of Figure 2;

Figure 6 is a sectional view on the line 6—6 of Figure 10;

Figure 7 is a sectional view on the line 7—7 of Figure 2;

Figure 8 is a sectional view on the line 8—8 of Figure 2;

Figure 9 is a rear view of a vehicle chassis showing an embodiment of the invention in elevation in raised or operative position;

Figure 10 is a rear view of a vehicle chassis showing an embodiment of the invention in retracted or inoperative position;

Figure 11 is a sectional view on the line 11—11 of Figure 9;

Figure 12 is a sectional view on the line 12—12 of Figure 9;

Figure 13 is a front elevation of the transmission box;

Figure 14 is a top plan view of the transmission box;

Figure 15 is a sectional view on the line 15—15 of Figure 13;

Figure 16 is an interior view of the transmission box with the top cover and lever controls removed and Figure 17 is a perspective view of one of the jack arms.

Referring more in detail to the drawings, the reference numeral 20 designates the form of the invention that is attached to the front axle 21 of a vehicle 22.

The parking device for the front of the vehicle comprises an L-shaped hanger bracket 23 having a flanged end 24 to receive U-bolts 25, whereby the hanger bracket is firmly secured to the front axle 21 of the vehicle 22.

Pivoted at 26 and 26' respectively on the bracket 23 are the upper ends of the arms 27 and 27' respectively of a scissors type of jack 28, the arms 29 and 29' completing the jack.

As seen in Figure 17, all of the arms are of the same construction and are provided with bifurcated apertured ends 30 at their respective pivot points.

The lower end of arm 27 is pivoted at 31 to the travelling nut 32 as is the upper end of the arm 29. The lower end of the arm 27' is pivoted at 33 to the sleeve 34, as is the upper end of the arm 29'. Mounted on the outer end of the sleeve is a gear box 35 which houses the worm wheel gear 36 which is fixed to the screw 37 which is rotatably mounted in the sleeve 34, and carries the nut 32.

The gear 36 is adapted to mesh with the pinion gear worm 38 which is connected by a flexible shaft 39 to a transmission box 40 which is secured to the chassis of the vehicle and the construction of which will be later described.

The lower ends of the arms 29 and 29' are pivoted at 41 and 41' respectively to the plate 42 fixed on the jack axle housing 43 in which is journalled the longitudinally extending shaft 44 having bevelled gears 45 on each end thereof which mesh with bevelled gears 46 on the axles 47 of the rubber tired parking wheels 48. Fixed to the shaft 44, centrally thereof, is a worm wheel gear 49 which meshes with a pinion gear worm 50 which is connected by a flexible shaft 51 to the transmission box 40. A gear box 52 formed in the housing 43 covers the gears 49 and 50.

The parking device for the rear axle housing 53 of the vehicle 22 is similar in construction to the parking device for the front axle, the difference residing in the hanger bracket 54 which is secured to the differential housing 55 by the bolts 56 which usually hold the cover plate for the housing 55 in place.

The arms 27 and 27' are pivoted at 57 and 57' respectively to the bracket 54 and at 31 and 33 to the nut 32 and sleeve 34 respectively, while the arms 29 and 29' are pivoted at 31 and 33 and 41 and 41' respectively as previously described. The latter arms are pivoted to the nut 32, sleeve 34 and plate 42 of the housing 43.

The gear box 35 on the sleeve 34 is connected by the flexible shaft 59 to the box 40, while the gear box 52 on the housing 43 is connected by the flexible shaft 58 to the box 40. The screw 37 is similarly provided with the gear 36, and the wheels 48 are similarly mounted in the housing 43 as previously described.

The formation of the hanger brackets 23 and 54 permit the parking devices to be raised to a level with the respective axles on which they are mounted, as shown in Figures 3 to 10, to give full road clearance to the vehicle. None of the mechanism extending below the lowest level of the axles.

The gear box more specifically shown in Figures 13 to 16, inclusive, has a drive shaft 60 journalled centrally thereof, which is provided with a sprocket wheel 61 on its outer free end, which engages the chain drive 62. The chain 62 derives its power to drive the sprocket wheel 61 from a gear 63 with which it is engaged, that is fixed on the crank shaft 64 of the vehicle. The crankshaft drives the fan 65 by the conventional fan belt 66. The gear 67 is fixed to the opposite end of the shaft 60 within the box, and the shaft is journalled in bearings 68 carried by the box 40. Gear 67 is intermediate of and meshing with gears 69 and 70 respectively, which are mounted on the sleeves 71 and 72 respectively that are journalled in bearings 71' and 72' carried by the box 40, and have the bevelled gears 73 and 74 respectively formed on the opposite ends thereof. The sleeves and their associate gears are mounted on the sliding selector sleeves 75 and 76 respectively, which are in turn mounted on shafts 77 and 78 which are freely rotatable within the inner races of the bearings 71' and 72' respectively. The shaft 77 is connected at its opposite ends to the flexible shafts 39 and 59, and shaft 78 is connected at its opposite ends to the flexible shafts 51 and 58. The selector sleeve 75 is engaged by the forked end 79 of the shift lever 80. The sleeve, on opposite sides of the forked end 79 is provided with gear engaging members 81 and 82 respectively, which engage the complementary shaped member 83 on the gear 73 and the complementary shaped member 84 on the bevelled gear 85 which is formed on the sleeve 86 sleeved on the sleeve 86' and the sleeve 75 and the sleeve 86' is journalled in the bearing 87 in the gear box 40, and sleeved on the shaft 77. Both gears 73 and 85 mesh with a bevelled gear 87' journalled by means of a stub shaft 88 in the bearing 89 carried by the box 40.

When lever 80 is moved forwardly the gear engaging member on the sleeve 75 will be engaged with number 84 and by reason of the sliding key connection 75' of the sleeve 75 with the shaft 77 the gear 85 will be caused to rotate by the shaft 77 which in turn will rotate shafts 39 and 59. If lever 80 is moved rearwardly the number 81 will engage the member 83 and gear 73 will cause the shaft to rotate in the opposite direction. Thus if the lever 99 is moved forward, the wheels 48 will be caused to rotate toward the left to move the vehicle in this direction. If the lever 99 is moved rearwardly, the wheels 48 will be caused to rotate toward the right to move the vehicle in this direction, vertical positions of the lever being neutral without movement in either direction.

The selector sleeve 76 is similarly constructed to the sleeve 75, having the gear engaging members 90 and 91 respectively, which engage the complementary shaped member 92 on the gear 74, and the complementary shaped member 93 on the bevelled gear 94 which is fixed on the sleeve 95 sleeved on the sleeve 96 journalled in the bearing 97 carried by the box 40. The sleeve 96 is sleeved on the sleeve 76 and the shaft 78. The forked end 98 of the lever 99 engages the selector sleeve 76 intermediate of the members 90 and 91, so that when the lever 99 is moved forward, the vehicle will be moved to the left and when the lever 99 is moved rearwardly, the vehicle will be moved to the right. The gears 74 and 94, as do the gears 73 and 85 which mesh with a gear 87', mesh with a bevelled gear 102 journalled by means of a stub shaft 103 in the bearing 104 carried by the box 40.

The jacks, at the front and rear, move simultaneously to raise both ends of the vehicle.

The box 40 is provided with a removable cover 100, provided with parallel opposed slots 101 through which the levers extend, into the driver's compartment of the vehicle, as shown in Figure 1.

In operation, the lever 80 is moved forward to raise the vehicle and the lever 99 is then moved in either direction to cause the vehicle to travel either to the right or left for parking the vehicle. The power to drive the mechanism is derived from the crankshaft, as previously described.

There has thus been provided, a parking mechanism which is simple in construction and operation, a parking device so installed that complete road clearance is available when the mechanism is in retracted position.

The wheels are raised or lowered in a straight line giving maximum lifting power and being attached to the axles, the wheels do not sag, due to the action of the springs in the same manner as if the mechanism were attached to the body or frame of the vehicle.

The device holds the vehicle rigid during the sideward movement, is easily repaired, does not detract from the appearance of the vehicle, and can be inexpensively manufactured.

It will allow more vehicles to be parked in a city block, a much needed advantage in present day times.

While the device has been described as a parking mechanism, it is to be understood that the device may also be used when it is desired to raise the vehicle to repair or replace a flat tire. The use of a standard type of jack is eliminated, as well as the damaging of one's clothing in applying a standard jack for use in raising a vehicle. It will be a great boon to women drivers as well as to handicapped drivers, who could not, under ordinary circumstances, use an ordinary jack. The device also prevents the vehicle from falling off the jack, which is often the case where an ordinary jack is used.

The device, therefore, has a dual purpose, and provides a safe medium for lifting a vehicle from the wheels thereof for any desired reason.

It is believed that from the foregoing description, the character, construction and advantages of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a parking device for use with the power transmission of a motor vehicle, the improvement comprising an elongated box like casing, a first shaft journalled in said casing longitudinally thereof, gear members fixed on opposite ends of said shaft and within said casing, stub axles journalled in opposite ends of the casing, gears fixed on the stub axles within the casing meshing with the gears on the first shaft, ground engaging wheels on the outer ends of the stub axles, a worm wheel fixed to the first shaft centrally thereof, a first flexible shaft connected to the power transmission, a worm fixed on said first flexible shaft and said worm meshing with said worm wheel for the driving of the ground engaging wheels, a lower plate fixed to the box like casing centrally thereof, a pair of arms connected at their lower ends to the opposite ends of the plate, a travelling nut pivotally connected to one arm at the upper end thereof, a gear box connected to the other arm at the upper end thereof and having gears therein, a second pair of arms connected at their lower ends respectively to said travelling nut and gear box, an upper plate pivotally connected to each upper end of said second pair of arms and fixed to the motor vehicle above and in line with the first plate, a sleeve connected to said gear box, a screw rotatably mounted in the sleeve and operatively connected at one end to one of the gears in said gear box and at the other end threadedly engaging said travelling nut, and a second flexible shaft connected at one end to said transmission and at the other end to the other gear in said gear box for the operation of said screw for the raising and lowering of said motor vehicle with relation to said box like casing.

TILDEN F. HALL.
FLOYD C. HALL.

REFERENCES CITED

The following references are of record in the file of this patent:

UNITED STATES PATENTS

| Number | Name | Date |
| --- | --- | --- |
| 1,322,947 | Rapson | Nov. 25, 1919 |
| 1,374,044 | Valeur | Apr. 5, 1921 |
| 1,513,282 | Sheets | Oct. 28, 1924 |
| 1,699,031 | Sevault et al. | Jan. 15, 1929 |
| 1,940,724 | Mizzy et al. | Dec. 26, 1933 |
| 2,058,530 | Thomas | Oct. 27, 1936 |